US011203963B2

(12) United States Patent
Källkvist et al.

(10) Patent No.: US 11,203,963 B2
(45) Date of Patent: Dec. 21, 2021

(54) SYSTEM AND A METHOD FOR DIAGNOSING FUNCTIONALITY OF DOSING UNITS OF A FLUID DOSING SYSTEM

(71) Applicant: Scania CV AB, Södertälje (SE)

(72) Inventors: Kurt Källkvist, Strängnäs (SE); Christer Lundberg, Rönninge (SE)

(73) Assignee: Scania CV AB, Södertälje (SE)

( * ) Notice: Subject to any disclaimer, the term of this patent is extended or adjusted under 35 U.S.C. 154(b) by 99 days.

(21) Appl. No.: 16/646,294

(22) PCT Filed: Sep. 6, 2018

(86) PCT No.: PCT/SE2018/050890
§ 371 (c)(1),
(2) Date: Mar. 11, 2020

(87) PCT Pub. No.: WO2019/059823
PCT Pub. Date: Mar. 28, 2019

(65) Prior Publication Data
US 2020/0271038 A1  Aug. 27, 2020

(30) Foreign Application Priority Data
Sep. 22, 2017  (SE) .................................. 1751175-9

(51) Int. Cl.
*F01N 11/00*  (2006.01)
*F01N 13/00*  (2010.01)
(Continued)

(52) U.S. Cl.
CPC ............ *F01N 11/00* (2013.01); *F01N 3/2066* (2013.01); *F01N 11/002* (2013.01);
(Continued)

(58) Field of Classification Search
CPC .... F01N 11/00; F01N 11/002; F01N 13/0093; F01N 3/2066; F01N 2550/05;
(Continued)

(56) References Cited

U.S. PATENT DOCUMENTS

2012/0286063 A1  11/2012 Wang et al.
2013/0186470 A1   7/2013 Offenhuber et al.
(Continued)

FOREIGN PATENT DOCUMENTS

DE  102011078870 A1  7/2012
DE  102013218897 A1  3/2015
(Continued)

OTHER PUBLICATIONS

Scania CV AB, International Application No. PCT/SE2018/050890, International Preliminary Report on Patentability, dated Mar. 24, 2020.
(Continued)

*Primary Examiner* — Brandon D Lee
(74) *Attorney, Agent, or Firm* — Moore & Van Allen PLLC; W. Kevin Ransom

(57) ABSTRACT

Disclosed is a method for diagnosing functionality of dosing units of a fluid dosing system comprising at least two dosing units, a tank unit for holding a fluid, and a pump unit for pressurizing the fluid for the dosing units. The method comprises determining a first hydraulic stiffness value on the basis of first pressure variations and determining a second hydraulic stiffness value on the basis of said second pressure variations. The first hydraulic stiffness value and second hydraulic stiffness value are compared. In a case where the first hydraulic stiffness value and second hydraulic stiffness value differ to a certain extent, concluding that malfunction of at least one of said dosing units is at hand, and in a case where the first hydraulic stiffness value and the second
(Continued)

hydraulic stiffness value do not differ to said certain extent, concluding that the first and second dosing units function as intended.

13 Claims, 5 Drawing Sheets

(51) Int. Cl.
*F01N 3/20* (2006.01)
*G01M 15/10* (2006.01)

(52) U.S. Cl.
CPC ....... *F01N 13/0093* (2014.06); *G01M 15/106* (2013.01); *F01N 2550/05* (2013.01); *F01N 2610/1406* (2013.01); *F01N 2610/1433* (2013.01); *F01N 2610/1453* (2013.01); *F01N 2900/1808* (2013.01); *F01N 2900/1812* (2013.01); *F01N 2900/1814* (2013.01); *F01N 2900/1822* (2013.01)

(58) Field of Classification Search
CPC ..... F01N 2610/1406; F01N 2610/1433; F01N 2610/1453; F01N 2900/1808; F01N 3/021; F01N 2560/14; F01N 2610/02; F01N 2610/146; F01N 13/009; F01N 3/208; F01N 3/103; F01N 2560/08; G01M 15/106; Y02A 50/20; Y02T 10/12
See application file for complete search history.

(56) References Cited

U.S. PATENT DOCUMENTS

| | | |
|---|---|---|
| 2014/0369899 A1 | 12/2014 | Fahrenkrug et al. |
| 2015/0104363 A1 | 4/2015 | Singh et al. |
| 2015/0196878 A1 | 7/2015 | Nunez et al. |
| 2015/0361857 A1* | 12/2015 | Matsuo .................. F01N 11/00 60/277 |

FOREIGN PATENT DOCUMENTS

| | | |
|---|---|---|
| DE | 102014222739 A1 | 5/2016 |
| WO | 2014200413 A1 | 12/2014 |

OTHER PUBLICATIONS

Scania CV AB, International Application No. PCT/SE2018/050890, International Search Report, dated Oct. 31, 2018.
Scania CV AB, International Application No. PCT/SE2018/050890, Written Opinion, dated Oct. 31, 2018.

\* cited by examiner

SYSTEM AND A METHOD FOR DIAGNOSING FUNCTIONALITY OF DOSING UNITS OF A FLUID DOSING SYSTEM

CROSS-REFERENCE TO RELATED APPLICATIONS

This application is a national stage application (filed under 35 § U.S.C. 371) of PCT/SE2018/050890, filed Sep. 6, 2018 of the same title, which, in turn, claims priority to Swedish Application No. 1751175-9 filed Sep. 22, 2017; the contents of each of which are hereby incorporated by reference.

FIELD OF THE INVENTION

The present invention relates to a method for diagnosing functionality of dosing units of a fluid dosing system. The invention relates also to a computer program product comprising program code for a computer for implementing a method according to the invention. It relates also to a system for diagnosing functionality of dosing units of a fluid dosing system and a motor vehicle equipped with the system.

In particular the present invention relates to a system and a method for diagnosing functionality of at least two dosing units of a reducing agent dosing system.

BACKGROUND OF THE INVENTION

There are many different fluid dosing systems, e.g. for vehicle applications. One example of such a fluid dosing system is a reducing agent provision system for vehicle emission control. Another example is a fuel dosing system for regeneration of particulate filters of a vehicle emission control system.

Vehicle combustion engine emission control systems are today arranged with catalytic configurations e.g. for conversion of $NO_x$ gas. The emission control systems may comprise a DOC-unit (Diesel Oxidation Catalyst), DPF-unit (Diesel Particulate Filter), SCR-unit (Selective Catalytic Reduction) and an ammonia slip catalyst. In such a system a reducing agent is provided for reducing a prevailing $NO_x$-content of an exhaust gas of said engine. The reducing agent is held in a tank and a pump is arranged to via lines provide pressurized fluid reducing agent to a dosing unit. Usually such a system is provided with a line for achieving a return flow of excessive reducing agent to the tank from said dosing unit.

Vehicle combustion engine emission control systems are today arranged with particulate filters, e.g. a DPF. In such a system a liquid fuel is provided to an emission control system for controlling temperatures of emission control system members. The fuel provision may have the purpose of regenerating a particulate filter and/or achieving proper operational temperatures of an SCR-unit. The fuel is held in a tank and a pump is arranged to via lines provide pressurized fluid fuel upstream of relevant emission control system members.

Some fluid dosing systems have a number of dosing units, e.g. 2, 3 or more dosing units.

Different fluid dosing systems of e.g. vehicles are associated with national or regional laws and/or regulations relating to dosing accuracy. It is of outmost importance to provide accurate and reliable fluid dosing systems. Various methods for diagnosing functionality of fluid dosing units are known today. It is more complicated and time consuming to perform diagnosing methods if two or more dosing units are provided for the fluid dosing system.

One example of a fluid dosing system diagnosing method comprises the steps of measuring a volume in said tanks for holding reducing agent/fuel during dosing and determining if a volume change of the fluid in said tank is corresponding to an estimated fluid dosing amount. Hereby functionality of the dosing units may be determined. This is however a quite accurate method if measurements are performed for relatively large volume changes of the fluid in said tank. The method is hereby very time consuming, also because of that the diagnosing is performed for one dosing unit at the time, where a relatively large amount of fluid has to be dosed for achieving more accurate results.

US2012286063 relates to a method for determining if a dosing unit is defective by measuring pressure changes in the system during dosing.

SUMMARY OF THE INVENTION

An object of the present invention is to propose a novel and advantageous method for diagnosing functionality of dosing units of a fluid dosing system.

Another object of the invention is to propose a novel and advantageous system and a novel and advantageous computer program for diagnosing functionality of dosing units of a fluid dosing system.

Another object of the present invention is to propose a novel and advantageous method providing a cost effective and reliable diagnosing functionality of dosing units of a fluid dosing system.

Another object of the invention is to propose a novel and advantageous system and a novel and advantageous computer program providing a cost effective and reliable diagnosing functionality of dosing units of a fluid dosing system.

Yet another object of the invention is to propose a method, a system and a computer program achieving a robust, accurate and automated diagnosing functionality of dosing units of a fluid dosing system.

Yet another object of the invention is to propose an alternative method, an alternative system and an alternative computer program for diagnosing functionality of dosing units of a fluid dosing system.

Some of these objects are achieved with a method according to claim 1. Other objects are achieved with a system in accordance with what is depicted herein. Advantageous embodiments are depicted in the dependent claims. Substantially the same advantages of method steps of the innovative method hold true for corresponding means of the innovative system.

According to an aspect of the invention there is provided a method for diagnosing functionality of dosing units of a fluid dosing system comprising at least two dosing units, a tank unit for holding a fluid and a pump unit for pressurizing said fluid for said dosing units, comprising the steps of:

determining first pressure variations downstream of said pump unit during sole operation of a first dosing unit of said dosing system;
 determining second pressure variations downstream of said pump unit during sole operation of a second dosing unit of said dosing system;
 determining a first hydraulic stiffness value on the basis of said first pressure variations;
 determining a second hydraulic stiffness value on the basis of said second pressure variations;
 comparing said first hydraulic stiffness value and said second hydraulic stiffness value; and in case said first hydraulic stiffness value and said second hydraulic stiffness value differs to a certain extent, concluding that malfunction of at least one of said dosing units is at hand, and in case said first hydraulic stiffness value and said second hydraulic stiffness value do not differ to said certain extent, concluding that said first dosing unit and said second dosing unit function as intended.

The first dosing unit and the second dosing unit are subjected to the same fluid pressure. The first dosing unit and the second dosing unit are both provided downstream said pump and upstream a throttle unit and thus forms a portion of the fluid dosing system. It is assumed that the fluid presents a stationary flow.

Herein it is advantageously used that the hydraulic stiffness value is proportional to a ratio of an expected volume decrease during dosing and a pressure rate constant $\gamma$, which ratio is proportional to a ratio of pressure amplitude and periodicity of pressure oscillations during dosing by one of the dosing units. The pressure rate constant $\gamma$ relates to a pressure change rate when a dosing unit is open. The pressure rate constant $\gamma$ relates to a pressure change within the system at a given volume change rate within the system.

It is assumed that these ratios are constant for one fluid dosing system. Hereby the determined hydraulic stiffness values may be compared with each other. In this way the performance of the first dosing unit and the second dosing unit are compared. If the hydraulic stiffness values differ more than a predetermined threshold value it is determined that malfunction of at least one of said dosing units is at hand.

If the first hydraulic stiffness value is exceeding the second hydraulic stiffness value to a certain extent the first dosing unit might be overdosing, and/or the second dosing unit is underdosing.

Hereby a reliable and accurate diagnosis method is provided for determining malfunction of one or more dosing units of a plurality of dosing units of a fluid dosing system.

The fluid dosing system may be arranged for dosing a reducing agent, fuel or other fluid. Hereby a versatile diagnosing method is provided. The fluid may according to one embodiment be provided in gaseous form. Hereby a versatile diagnosing method is provided.

The method may comprise the step of:
if it is concluded that malfunction of at least one of said dosing units is at hand, determining which one of said first dosing unit and said second dosing unit is associated with a malfunction. This may be performed in different ways. Hereby a versatile diagnosing method is provided.

The method may comprise the step of:
determining which one of said first dosing unit and said second dosing unit is associated with a malfunction by at least one of the following test procedures, said procedures comprising the step of:
1) using tank fluid volume changes determined during operation of the dosing system;
2) using pump unit operation determined during operation of the dosing system
3) using fluid flow to and from said first dosing unit and said second dosing unit determined during operation of the dosing system; or
4) performing service workshop tests of said first dosing unit and said second dosing unit.

Hereby pump unit operation may relate to pump speed (rev/s) or electrical power. This may be performed by relating pump operation work, i.e. an amount of required pump operation, with an amount of desired dosing volume. If the pump unit is pumping more fluid than what is estimated to be dosed, so called over dosing may be at hand, and vice versa.

The method may comprise the steps of:
determining said first hydraulic stiffness value by using amplitude and periodicity of said first pressure variations; and
determining said second hydraulic stiffness value by using amplitude and periodicity of said second pressure variations.

Hereby the hydraulic stiffness corresponding to operation of the first dosing unit and the second dosing unit may be determined in an accurate way by means of a pressure sensor and means for determining periodicity of the pressure oscillations generated during a dosing procedure.

The method may comprise the steps of:
in case said dosing system comprises three or more dosing units, determining a respective hydraulic stiffness value for said at least three dosing units based upon pressure variations downstream of said pump unit during sole operation of each dosing unit of said dosing system; and
determining which one of said at least three dosing units is associated with a malfunction by means of pairwise mutual comparison for all determined hydraulic stiffness values.

The inventive method is advantageously applicable to many different fluid dosing system designs. The inventive method may be applicable to fluid dosing systems comprising any number of dosing units, given that the dosing units are arranged for independent operation downstream the pump unit and upstream a throttle unit.

According to one embodiment there is provided a system for diagnosing functionality of dosing units of a fluid dosing system comprising at least two dosing units, a tank unit for holding a fluid and a pump unit for pressurizing said fluid for said dosing units, comprising:
means arranged for determining first pressure variations downstream of said pump unit during sole operation of a first dosing unit of said dosing system;
means arranged for determining second pressure variations downstream of said pump unit during sole operation of a second dosing unit of said dosing system;
means arranged for determining a first hydraulic stiffness value on the basis of said first pressure variations;
means arranged for determining a second hydraulic stiffness value on the basis of said second pressure variations;
means arranged for comparing said first hydraulic stiffness value and said second hydraulic stiffness value; and
means arranged for concluding that malfunction of at least one of said dosing units is at hand in case said first hydraulic stiffness value and said second hydraulic stiffness value differs to a certain extent, and means arranged for concluding that said first dosing unit and said second dosing unit function as intended in case said first hydraulic stiffness value and said second hydraulic stiffness value do not differ to said certain extent.

The system may comprise:
means arranged for determining which one of said first dosing unit and said second dosing unit is associated with a malfunction if it is concluded that malfunction of at least one of said dosing units is at hand.

The system may comprise:

means arranged for determining which one of said first dosing unit and said second dosing unit is associated with a malfunction by at least one of the following test procedures, said test procedures involving:
1) use of tank fluid volume changes determined during operation of the dosing system;
2) use of pump unit operation determined during operation of the dosing system;
3) use of fluid flow to and from said first dosing unit and said second dosing unit determined during operation of the dosing system; or
4) provision of service workshop tests of said first dosing unit and said second dosing unit.

The system may comprise:
means arranged for determining said first hydraulic stiffness value by using amplitude and periodicity of said first pressure variations; and
means arranged for determining said second hydraulic stiffness value by using amplitude and periodicity of said second pressure variations.

The system may comprise:
means arranged for, in case said dosing system comprises three or more dosing units, determining a respective hydraulic stiffness value for said at least three dosing units based upon pressure variations downstream of said pump unit during sole operation of each dosing unit of said dosing system; and
means arranged for determining which one of said at least three dosing units is associated with a malfunction by means of pairwise mutual comparison for all determined hydraulic stiffness values.

According to an aspect of the invention there is provided a vehicle comprising a system according to what is presented herein. Said vehicle may be any from among a truck, bus or passenger car. According to an embodiment the system is provided for a marine application or industrial application.

According to an aspect of the invention there is provided a computer program for diagnosing functionality of dosing units of a fluid dosing system comprising at least two dosing units, a tank unit for holding a fluid and a pump unit for pressurizing said fluid for said dosing units, wherein said computer program comprises program code for causing an electronic control unit or a computer connected to the electronic control unit to perform anyone of the method steps depicted herein, when run on said electronic control unit or said computer.

According to an aspect of the invention there is provided a computer program for diagnosing functionality of dosing units of a fluid dosing system comprising at least two dosing units, a tank unit for holding a fluid and a pump unit for pressurizing said fluid for said dosing units, wherein said computer program comprises program code stored on a computer-readable medium for causing an electronic control unit or a computer connected to the electronic control unit to perform anyone of the method steps depicted herein.

According to an aspect of the invention there is provided a computer program for diagnosing functionality of dosing units of a fluid dosing system comprising at least two dosing units, a tank unit for holding a fluid and a pump unit for pressurizing said fluid for said dosing units, wherein said computer program comprises program code stored on a computer-readable medium for causing an electronic control unit or a computer connected to the electronic control unit to perform anyone of the method steps depicted herein, when run on said electronic control unit or said computer.

According to an aspect of the invention there is provided a computer program product containing a program code stored on a computer-readable medium for performing anyone of the method steps depicted herein, when said computer program is run on an electronic control unit or a computer connected to the electronic control unit.

According to an aspect of the invention there is provided a computer program product containing a program code stored non-volatile on a computer-readable medium for performing anyone of the method steps depicted herein, when said computer program is run on an electronic control unit or a computer connected to the electronic control unit.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognize further applications, modifications and incorporations in other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations denote similar items in the various diagrams, and in which.

DETAILED DESCRIPTION OF THE INVENTION

Figure 1:
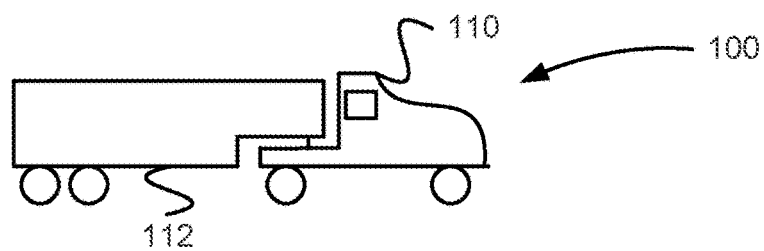
FIG. 1 schematically illustrates a vehicle according to an embodiment of the invention.

FIG. 1 depicts a side view of a vehicle 100. The exemplified vehicle 100 comprises a tractor unit 110 and a trailer 112. The vehicle 100 may be a heavy vehicle, e.g. a truck or a bus. It may alternatively be a car.

The inventive method and system are applicable to various vehicles, such as e.g. a mining machine, tractor, dumper, wheel-loader, platform comprising an industrial robot, forest machine, earth mover, road construction vehicle, road planner, emergency vehicle or a tracked vehicle.

The inventive method and system are applicable to various fluid dosing systems, such as reducing agent dosing systems and fuel dosing systems.

The invention is suitable for application in various systems comprising a combustion engine and an associated emission control system comprising a reducing agent dosing system. The invention is suitable for application in various systems comprising a combustion engine and a catalytic configuration. The catalytic configuration may comprise at least two dosing units. The catalytic configuration may comprise one or more DOC-units, DPF-units and SCR-units. It should be noted that the invention is applicable to various catalytic configurations and is therefore not confined to catalytic configurations for motor vehicles. The innovative method and the innovative system according to one aspect of the invention are well suited to other platforms which comprise a combustion engine, at least two reducing agent dosing units and a catalytic configuration than motor vehicles, e.g. watercraft. The watercraft may be of any kind, e.g. motorboats, steamers, ferries or ships.

The innovative method and the innovative system according to one aspect of the invention are also well suited to, for example, systems which comprise industrial combustion engines and/or combustion engine-powered industrial robots and an associated emission control system comprising at least two reducing agent dosing units and/or at least two fuel dosing units. According to one example the inventive method is applicable to two or more separately arranged fluid dosing systems, such as one reducing agent dosing system and one fuel dosing system, which systems are arranged for operation on the same platform, such as a vehicle.

The innovative method and the innovative system according to one aspect of the invention are also well suited to various kinds of power plants, e.g. an electric power plant which comprises a combustion engine-powered generator and an associated emission control system comprising at least two fluid dosing units.

The innovative method and the innovative system are also well suited to various combustion engine systems comprising an associated emission control system comprising at least two fluid dosing units.

The innovative method and the innovative system are well suited to any engine system which comprises an engine, e.g. on a locomotive or some other platform, and an associated emission control system comprising at least two fluid dosing units.

The innovative method and the innovative system are well suited to any system which comprises a $NO_x$-generator an associated emission control system comprising at least two fluid dosing units.

The term "link" refers herein to a communication link which may be a physical connection such as an opto-electronic communication line, or a non-physical connection such as a wireless connection, e.g. a radio link or microwave link.

The term "line" refers herein to a passage for holding and conveying a fluid, e.g. a reducing agent in liquid form or fuel. The line may be a pipe of any size and be made of any suitable material, e.g. plastic, rubber or metal.

The term "reductant" or "reducing agent" refers herein to an agent used for reacting with certain emissions in an SCR system. These emissions may for example be $NO_x$-gas. The terms "reductant" and "reducing agent" are herein used synonymously. In one version, the reductant is so-called AdBlue. Other kinds of reductants may of course be used. AdBlue is herein cited as an example of a reductant, but one skilled in the art will appreciate that the innovative method and the innovative system are feasible with other types of reductants.

The term "fuel" refers herein to any fuel for powering an engine having an associated emission control system comprising a catalytic configuration. Fuel may also, where applicable, be supplied to the emission control system downstream of said engine so as to control a prevailing temperature of the exhaust gas and thus the catalytic configuration. Said fuel may comprise diesel, gasoline or ethanol, or any other suitable fuel.

The term "hydraulic stiffness value" refers herein to a ratio between the pressure rate constant γ and the pressurized volume of the system. Hereby is assumed that a substantially constant reducing flow is provided during dosing by the dosing units.

Figure 2A:
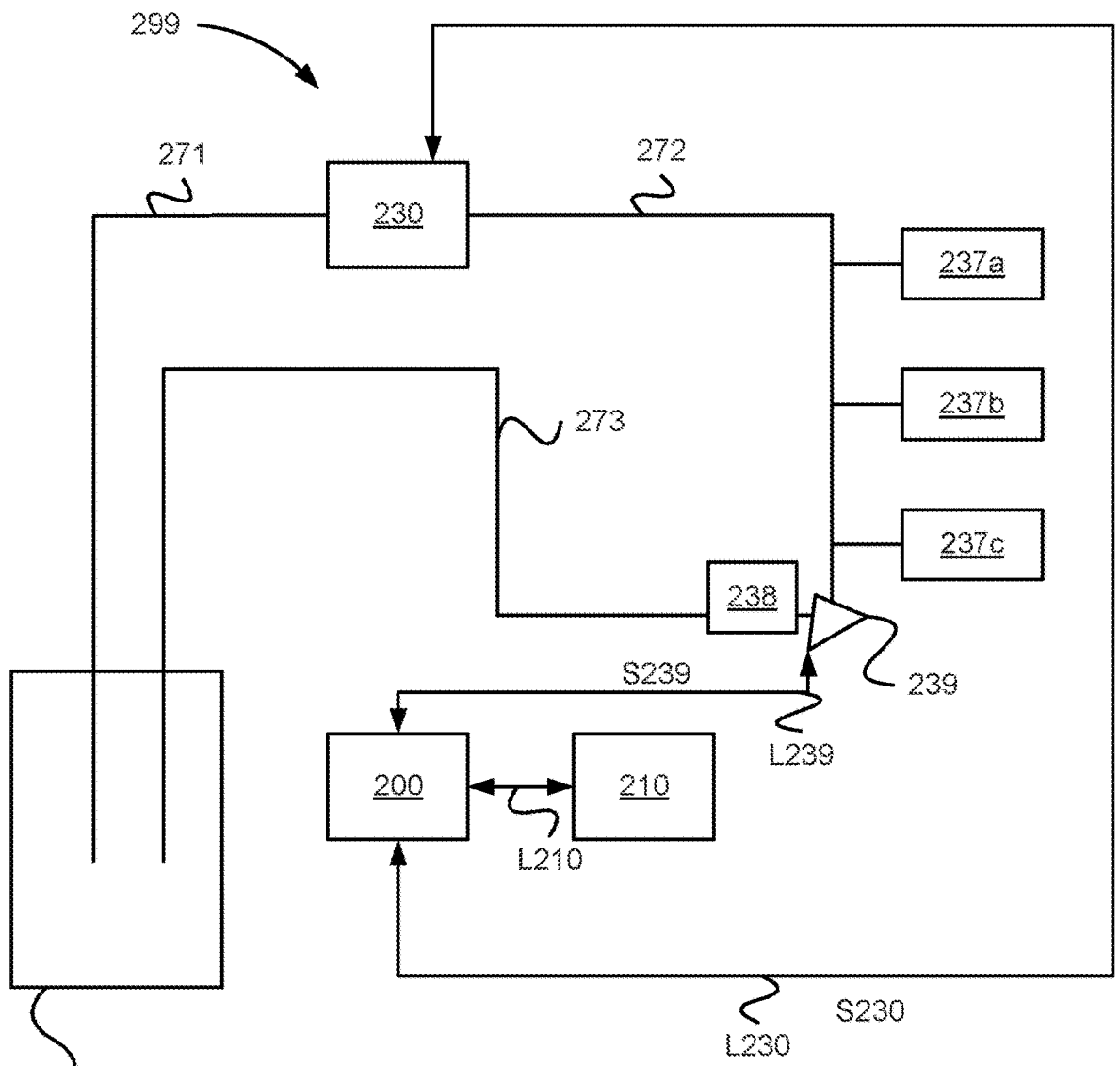
FIG. 2a schematically illustrates a system according to an embodiment of the invention.

FIG. 2a schematically illustrates a system 299 according to an example embodiment of the invention. The system 299 is situated in the tractor unit 110 and may be part of a catalytic configuration, also denoted exhaust gas processing configuration. It comprises in this example a tank 205 arranged to hold a reductant. The tank 205 is adapted to holding a suitable amount of reductant and also to being replenishable as necessary. The tank 205 may be adapted to hold e.g. 75 or 50 litres of reductant.

A first line 271 is provided to lead the reductant to a pump 230 from the tank 205. The pump 230 may be any suitable pump. The pump 230 may be arranged to be driven by an electric motor (not depicted). The pump 230 may be adapted to drawing the reductant from the tank 205 via the first line 271 and supplying it via a second line 272 to a first dosing unit 237a, a second dosing unit 237b and a third dosing unit 237c. The first, second and third dosing units may also be referred to as a reducing agent dosing unit. Each of the dosing units 237a, 237b and 237c comprises an electrically controlled dosing valve by means of which a flow of reductant added to the exhaust system can be controlled. The pump 230 is adapted to pressurizing the reductant in the second line 272. Downstream of the third dosing unit 237c a throttle unit 238 is provided. The pressure of the reductant may build up in the system 299 by the throttle unit 238. Operation of the throttle unit 238 may be controlled by a first control unit 200.

A first control unit 200 is arranged for communication with the pump 230 via a link L230. The first control unit 200 is arranged to send control signals S230 via said link L230. The first control unit 200 is arranged to control operation of said pump 230 so as to for example adjust flows of the reducing agent within the system 299. The first control unit 200 is arranged to control an operation power of the pump 230 e.g. by controlling the electric motor.

The dosing units 237a, 237b and 237c are adapted to supplying said reductant to an exhaust system (see FIG. 2b) of the vehicle 100. More specifically, they are adapted to supplying a suitable amount of reductant in a controlled way to an exhaust system of the vehicle 100. In this version, three SCR catalysts (see FIG. 2b) are situated downstream of the location in the exhaust system where the supply of reductant takes place.

A third line 273 running between the throttle unit 238 and the tank 205 is adapted to leading back to the tank 205 a certain amount of the reductant fed to the dosing units 237a, 237b, 237c. This configuration results in advantageous cooling of the dosing units 237a, 237b and 237c. The dosing unit 237 is thus cooled by a flow of the reductant when it is pumped through it from the pump 230 to the container 205.

The first control unit 200 is arranged for communication with the first dosing unit 237a via a link L237a. The first control unit 200 is arranged to send control signals S237a via said link L237a. The first control unit 200 is arranged to control operation of said first dosing unit 237a so as to for example control dosing of the reducing agent to the exhaust gas system of the vehicle 100.

The first control unit 200 is arranged for communication with the second dosing unit 237b via a link L237b. The first control unit 200 is arranged to send control signals S237b via said link L237b. The first control unit 200 is arranged to control operation of said first dosing unit 237b so as to for example control dosing of the reducing agent to the exhaust gas system of the vehicle 100.

The first control unit 200 is arranged for communication with the third dosing unit 237c via a link L237c. The first control unit 200 is arranged to send control signals S237c via said link L237c. The first control unit 200 is arranged to control operation of said first dosing unit 237c so as to for example control dosing of the reducing agent to the exhaust gas system of the vehicle 100.

The first control unit 200 is arranged to control operation of the first dosing unit 237a, second dosing unit 237b and the third dosing unit 237c independently.

A pressure sensor 239 is arranged for measuring a prevailing pressure P of the reducing agent in the second line 272. The pressure sensor 239 is arranged for communication with the first control unit 239 via a link L239. The pressure sensor 239 is arranged to continuously or intermittently send signals S239 comprising information about the measured pressure P of said reducing agent in said second line 272 to the first control unit 200. According to this example the pressure sensor 239 is positioned downstream of said third dosing unit 237c. However, the pressure sensor 239 may be arranged at any suitable position at the second line 272 for measuring the pressure P of the reducing agent.

A second control unit 210 is arranged for communication with the first control unit 200 via a link L210. It may be releasably connected to the first control unit 200. It may be a control unit external to the vehicle 100. It may be adapted to performing the innovative steps according to the invention. It may be used to cross-load software to the first control unit 200, particularly software for applying the innovative method. It may alternatively be arranged for communication with the first control unit 200 via an internal network on board the vehicle 100. It may be adapted to performing functions corresponding to those of the first control unit 200, such as e.g. diagnosing functionality of dosing units of a fluid dosing system comprising at least two dosing units, a tank unit for holding a fluid and a pump unit for pressurizing said fluid for said dosing units.

Figure 2B:
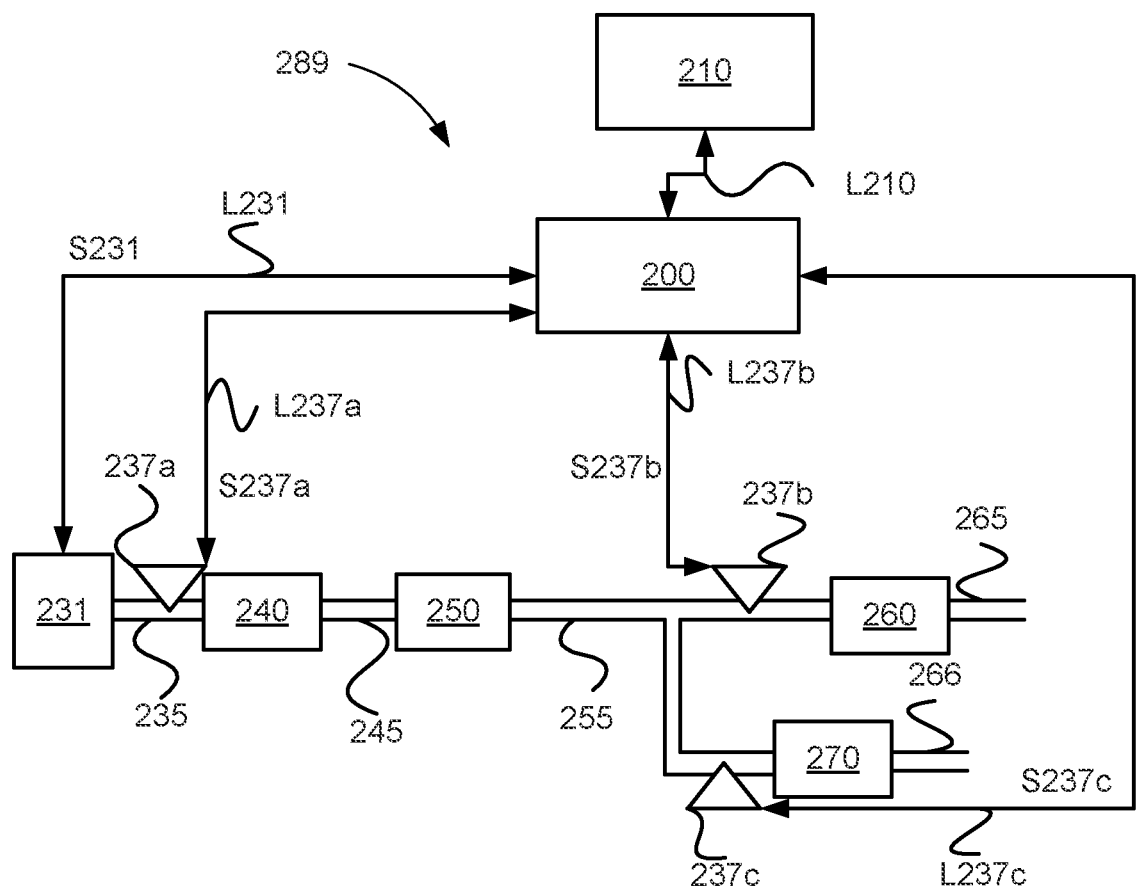
FIG. 2b schematically illustrates a system according to an embodiment of the invention.

FIG. 2b schematically illustrates a system 289 of the vehicle shown in FIG. 1 according to an embodiment of the invention. The system 289 may constitute a part of the inventive system for diagnosing functionality of dosing units of a fluid dosing system comprising three dosing units, a tank unit for holding a fluid and a pump unit for pressurizing said fluid for said dosing units.

A combustion engine 231 is during operation causing an exhaust gas flow which is lead via a first passage 235 to a first SCR-unit 240. A second passage 245 is arranged to convey said exhaust gas flow from said first SCR-unit 240 to a DPF-unit 250. A third passage 255 is arranged to convey said exhaust gas flow from said DPF-unit 250 to a second SCR-unit 260 and a third SCR-unit 270. Hereby said exhaust gas flow is divided into two portions, one leading to the second SCR-unit 260 and one leading to the third SCR-unit 270A. A fourth passage 265 is arranged to convey said exhaust gas flow from said second SCR-unit 260 to an environment of the catalytic configuration. A fifth passage 265 is arranged to convey said exhaust gas flow from said third SCR-unit 270 to an environment of the catalytic configuration. The catalytic configuration may further comprise one or more DOC-units and one or more ammonia slip catalysts.

Said first dosing unit 237a is arranged to provide said reductant to said first passage 235 upstream of said first SCR-unit 240 and downstream of said engine 231. Said first dosing unit 237a is arranged to provide said reductant for use of the first SCR-unit 240. The first control unit 200 is arranged to control operation of said first dosing unit 237a so as to, where applicable, dose reducing agent into the first passage 235.

Said second dosing unit 237b is arranged to provide said reductant to said second passage 255 upstream of said second SCR-unit 260. Said second dosing unit 237b is arranged to provide said reductant for use of the second SCR-unit 260. The first control unit 200 is arranged to control operation of said second dosing unit 237b so as to, where applicable, dose reducing agent upstream said second SCR-unit 260.

Said third dosing unit 237c is arranged to provide said reductant to said third passage 255 upstream of said third SCR-unit 270. Said third dosing unit 237c is arranged to provide said reductant for use of the third SCR-unit 270. The first control unit 200 is arranged to control operation of said third dosing unit 237c so as to, where applicable, dose reducing agent upstream said third SCR-unit 270.

The first control unit 200 is arranged to determine first pressure variations downstream of said pump unit during sole operation of said first dosing unit 237a. Hereby the first control unit 200 is arranged to not perform any dosing by means of the second dosing unit 260 and the third dosing unit 270. The first control unit 200 is arranged to determine a first hydraulic stiffness value B1 on the basis of said first pressure variations. The first control unit 200 is arranged to determine said first hydraulic stiffness value B1 by using amplitude and periodicity of said first pressure variations.

The first control unit 200 is arranged to determine second pressure variations downstream of said pump unit 230 during sole operation of the second dosing unit 237b of said dosing system. Hereby the first control unit 200 is arranged to not perform any dosing by means of the first dosing unit 240 and the third dosing unit 270. The first control unit 200 is arranged to determine a second hydraulic stiffness value B2 on the basis of said second pressure variations. The first control unit 200 is arranged to determine said second hydraulic stiffness value B2 by using amplitude and periodicity of said second pressure variations.

The first control unit 200 is arranged to determine third pressure variations downstream of said pump unit 230 during sole operation of the third dosing unit 237c of said dosing system. Hereby the first control unit 200 is arranged to not perform any dosing by means of the first dosing unit 240 and the second dosing unit 260. The first control unit 200 is arranged to determine a third hydraulic stiffness value B3 on the basis of said third pressure variations. The first control unit 200 is arranged to determine said third hydraulic stiffness value B3 by using amplitude and periodicity of said third pressure variations.

The first control unit 200 is arranged to compare said first hydraulic stiffness value B1, said second hydraulic stiffness value B2 and third hydraulic stiffness value B3.

The first control unit 200 is arranged to determine which one of said three dosing units is associated with a malfunction by means of pairwise mutual comparison for all determined hydraulic stiffness values B1, B2, B3.

The first control unit 200 is arranged to, in case said first hydraulic stiffness value B1, said second hydraulic stiffness value B2 and said third hydraulic stiffness value B3 differs to a certain extent, concluding that malfunction of at least one of said dosing units is at hand. The first control unit 200 is arranged to, in case said first hydraulic stiffness value B1, said second hydraulic stiffness value B2 said third hydraulic stiffness value B3 do not differ to said certain extent, concluding that said first dosing unit 237*a*, said second dosing unit 237*b* and said third dosing unit 237*c* function as intended.

The first control unit 200 is arranged to, if it is concluded that malfunction of at least one of said three dosing units is at hand, determining which one of said first dosing unit 237*a*, said second dosing unit 237*b* and said third dosing unit 237*c* is associated with a malfunction.

Said first control unit 200 is arranged to perform the process steps depicted herein, comprising the process steps which are detailed with reference to FIG. 4*b*.

Figure 3:
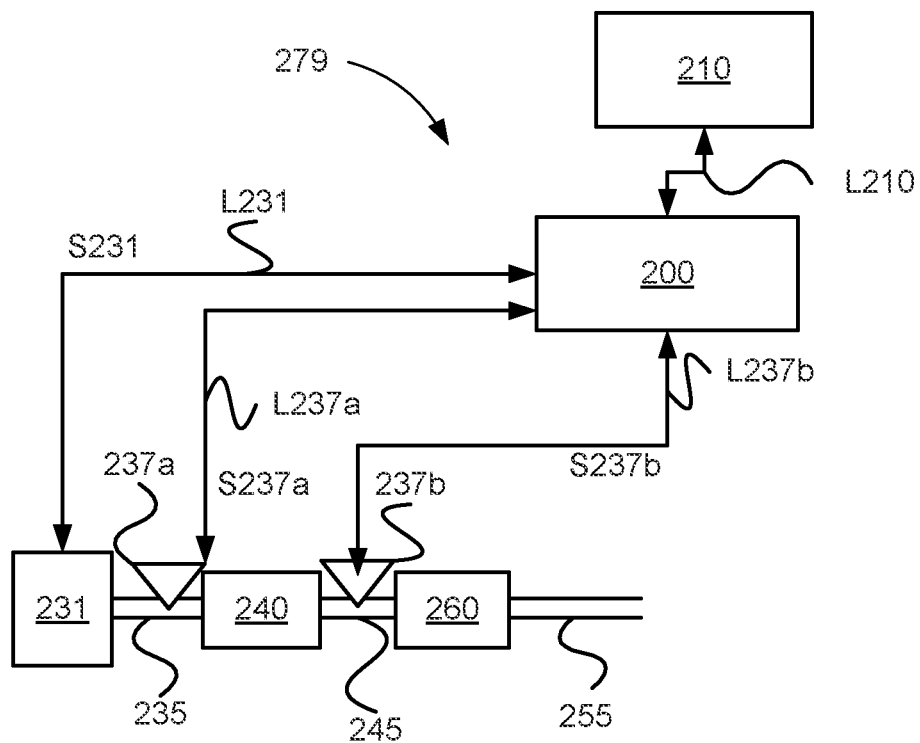
FIG. 3 schematically illustrates a diagram according to an aspect of the invention.

FIG. 3 schematically illustrates an alternative system 279 of the vehicle shown i FIG. 1 according to an embodiment of the invention. The system 279 may constitute a part of the inventive system for diagnosing functionality of dosing units of a fluid dosing system comprising two dosing units, a tank unit 205 for holding a fluid and a pump unit 230 for pressurizing said fluid for said two dosing units.

A combustion engine 231 is during operation causing an exhaust gas flow which is lead via a first passage 235 to a first SCR-unit 240. A second passage 245 is arranged to convey said exhaust gas flow from said first SCR-unit 240 to a second SCR-unit 250. A third passage 255 is arranged to convey said exhaust gas flow to an environment of the catalytic configuration.

Said first dosing unit 237*a* is arranged to provide said reductant to said first passage 235 upstream of said first SCR-unit 240 and downstream of said engine 231. Said first dosing unit 237*a* is arranged to provide said reductant for use of the first SCR-unit 240. The first control unit 200 is arranged to control operation of said first dosing unit 237*a* so as to, where applicable, dose reducing agent into the first passage 235.

Said second dosing unit 237*b* is arranged to provide said reductant to said second passage 255 upstream of said second SCR-unit 260. Said second dosing unit 237*b* is arranged to provide said reductant for use of the second SCR-unit 260. The first control unit 200 is arranged to control operation of said second dosing unit 237*b* so as to, where applicable, dose reducing agent upstream said second SCR-unit 260.

According to this example the first SCR-unit 240 and said second SCR-unit 260 are arranged in series. According to another example a plurality of SCR-units arranged in series. The inventive method is applicable to any emission control system comprising more than two dosing units.

According to this example the first control unit 200 is arranged to perform substantially the same routines as what is depicted to FIGS. 2*a* and 2*b*, with the difference that only two dosing units are provided with reference to FIG. 3. A similar structure as depicted with reference to FIG. 2*a* is applicable for the system depicted with reference to FIG. 3. The third dosing unit 237*c* is however omitted herein, as well as the third SCR-unit 270.

Figure 4A:
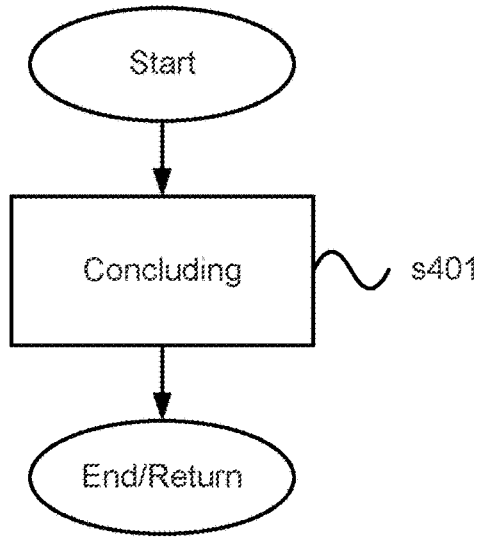
FIG. 4a is a schematic flowchart of a method according to an embodiment of the invention.

FIG. 4*a* schematically illustrates a flow chart of a method for diagnosing functionality of dosing units of a fluid dosing system comprising at least two dosing units, a tank unit 205 for holding a fluid and a pump unit 230 for pressurizing said fluid for said dosing units.

The method comprises a first method step s401. The method step s401 comprises the steps of:
- determining first pressure variations downstream of said pump unit 230 during sole operation of a first dosing unit 237*a* of said dosing system;
- determining second pressure variations downstream of said pump unit 230 during sole operation of a second dosing unit 237*b* of said dosing system;
- determining a first hydraulic stiffness value B1 on the basis of said first pressure variations; —determining a second hydraulic stiffness value B2 on the basis of said second pressure variations;
- comparing said first hydraulic stiffness value B1 and said second hydraulic stiffness value B2; and
- in case said first hydraulic stiffness value B1 and said second hydraulic stiffness value B2 differs to a certain extent, concluding that malfunction of at least one of said dosing units is at hand, and in case said first hydraulic stiffness value B1 and said second hydraulic stiffness value B2 do not differ to said certain extent, concluding that said first dosing unit 237*a* and said second dosing unit 237*b* function as intended.

After the method step s401 the method ends/is returned.

Figure 4B:
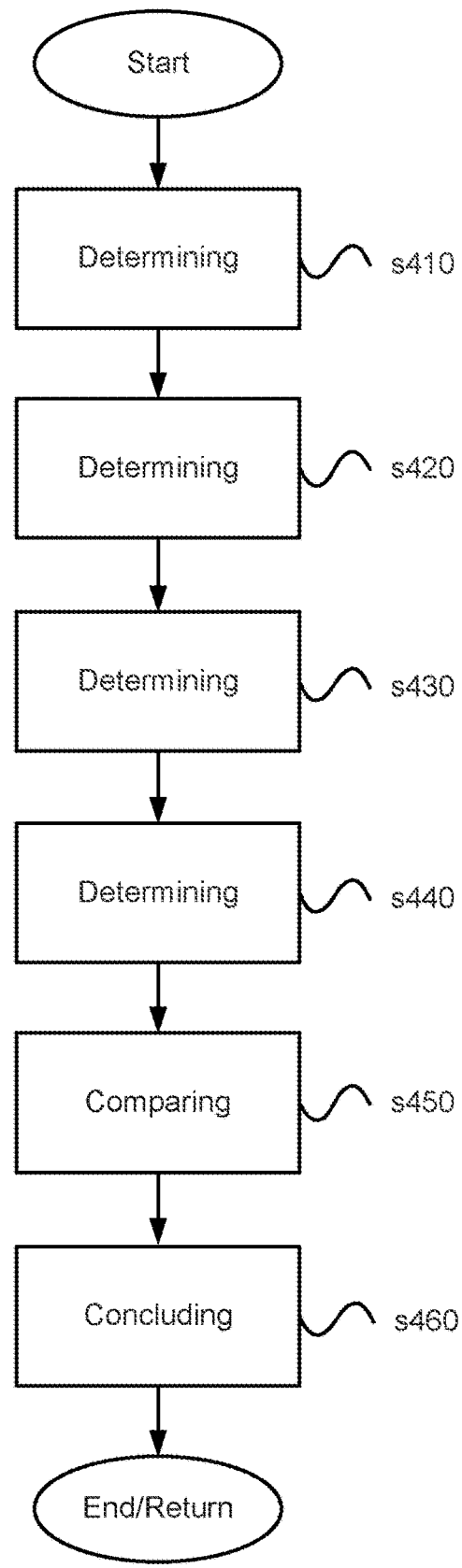
FIG. 4b is a schematic function diagram of a method according to an embodiment of the invention.

FIG. 4*b* schematically illustrates a method for diagnosing functionality of dosing units of a fluid dosing system comprising at least two dosing units, a tank unit 205 for holding a fluid and a pump unit 230 for pressurizing said fluid for said dosing units.

The method comprises a first method step s410. The method step s410 comprises the step of determining first pressure variations downstream of said pump unit 230 during sole operation of a first dosing unit 237*a* of said dosing system. The amplitude and periodicity of said first pressure variations are determined by means of said pressure sensor 239 and said first control unit 200. The amplitude and periodicity of said first pressure variations are generated during dosing by means of said first dosing unit 237*a*.

After the method step s410 a subsequent method step s420 is performed.

The method step s420 comprises the step of determining second pressure variations downstream of said pump unit 230 during sole operation of a second dosing unit 237*b* of said dosing system. The amplitude and periodicity of said second pressure variations are determined by means of said pressure sensor 239 and said first control unit 200. The amplitude and periodicity of said second pressure variations are generated during dosing by means of said second dosing unit 237*a*.

After the method step s420 a subsequent method step s430 is performed.

The method step s430 comprises the step of determining a first hydraulic stiffness value B1 on the basis of said first pressure variations. The step s430 may comprise the step of determining said first hydraulic stiffness value B1 by using amplitude and periodicity of said first pressure variations. This may be performed by means of the first control unit 200.

Herein B1 is proportional to a ratio between an expected volume decrease during dosing and the pressure rate constant $\gamma$, which ratio is proportional to a ratio of pressure amplitude of the reducing agent during dosing and periodicity of pressure variations of the reducing agent during dosing.

The method step s440 comprises the step of determining a second hydraulic stiffness value B2 on the basis of said second pressure variations. The method step s440 may comprising the step of determining said second hydraulic stiffness value B2 by using amplitude and periodicity of said second pressure variations. This may be performed by means of the first control unit 200.

Herein B2 is proportional to a ratio between an expected volume decrease during dosing and the pressure rate constant $\gamma$, which ratio is proportional to a ratio of pressure amplitude of the reducing agent during dosing and periodicity of pressure variations of the reducing agent during dosing.

After the method step s440 a subsequent step s450 is performed.

The step s450 comprises the step of comparing said first hydraulic stiffness value B1 and said second hydraulic stiffness value B2. This may be performed by means of the first control unit 200. This is performed because it is assumed that ratio between an expected volume decrease during dosing and the pressure rate constant γ is constant for the dosing system. Hereby the first hydraulic stiffness value B1 and the second hydraulic stiffness value B2 should be equal if the first dosing unit 237a as well as the second dosing unit 237b are functioning as intended/expected/correctly.

After the method step s450 a subsequent step s460 is performed.

The method step s460 comprises the step of, in case said first hydraulic stiffness value B1 and said second hydraulic stiffness value B2 differs to a certain extent, concluding that malfunction of at least one of said dosing units is at hand, and in case said first hydraulic stiffness value B1 and said second hydraulic stiffness value B2 do not differ to said certain extent, concluding that said first dosing unit and said second dosing unit function as intended. Said certain extent is according to one example a predetermined value. Said predetermined value may have been empirically determined. Said certain extent may correspond to a relative difference between said first hydraulic stiffness value B1 and said second hydraulic stiffness value B2 amounting e.g. 5, 10 or 20%. Said certain extent may be determined as any suitable relative difference between said first hydraulic stiffness value B1 and said second hydraulic stiffness value B2, e.g. 15% or more. In case more than two dosing units are at hand said examples of a relative difference between various hydraulic stiffness values are also applicable. This is performed by means of the first control unit 200.

The method step s460 may comprise the step of, if it is concluded that malfunction of at least one of said dosing units is at hand, determining which one of said first dosing unit 237a and said second dosing unit 237b is associated with a malfunction.

The method step s460 may comprise the step of determining which one of said first dosing unit 237a and said second dosing 237b unit is associated with a malfunction by at least one of the following test procedures.

According to a first procedure tank fluid volume changes determined during operation of the dosing system is used. Hereby a determined volume decrease may be compared to expected dosed fluid amount during operation of one dosing unit (the one to be diagnosed). The procedure may be repeated for each one of the dosing units so as to determine which one is malfunctioning.

According to a second procedure a pump unit operation determined during operation of the dosing system is used. Hereby the pump unit 230 is used as a fluid flow measuring device for determining if a fluid flow within the dosing system is changed according to what is expected.

According to a third procedure fluid flow to and from said first dosing unit and said second dosing unit determined during operation of the dosing system is used. This may be performed by means of flow measuring devices positioned upstream and downstream the dosing unit which is to be diagnosed. A volume determined on the difference between the fluid flow to and from the operating dosing unit is compared to a value representing expected corresponding dosing amount.

According to a fourth procedure service workshop tests of said first dosing unit and said second dosing unit are performed. These tests may involve the step of demounting the dosing units and performing separate performance tests and diagnosing routines of the same.

In case said dosing system comprises three or more dosing units, determining a respective hydraulic stiffness value B1, B2, Bn for said at least three dosing units based upon pressure variations downstream of said pump unit during sole operation of each dosing unit of said dosing system. Hereby it may be determined which one of said at least three dosing units is associated with a malfunction by means of pairwise mutual comparison for all determined hydraulic stiffness values.

EXAMPLE

In a case where there are three dosing units and a respective hydraulic stiffness value B1, B2 and B3 have been determined for each dosing unit and wherein a third dosing unit is malfunctioning, this may be identified by pairwise mutual comparison for all determined hydraulic stiffness values.

Herein B1=B2; B2≠B3 and B3≠B1

The third dosing is hereby determined to be malfunctioning if the third hydraulic stiffness value differs from both the first hydraulic stiffness value and the second hydraulic stiffness value to a certain extent.

After the step s460 the method is ended/returned.

Figure 5:
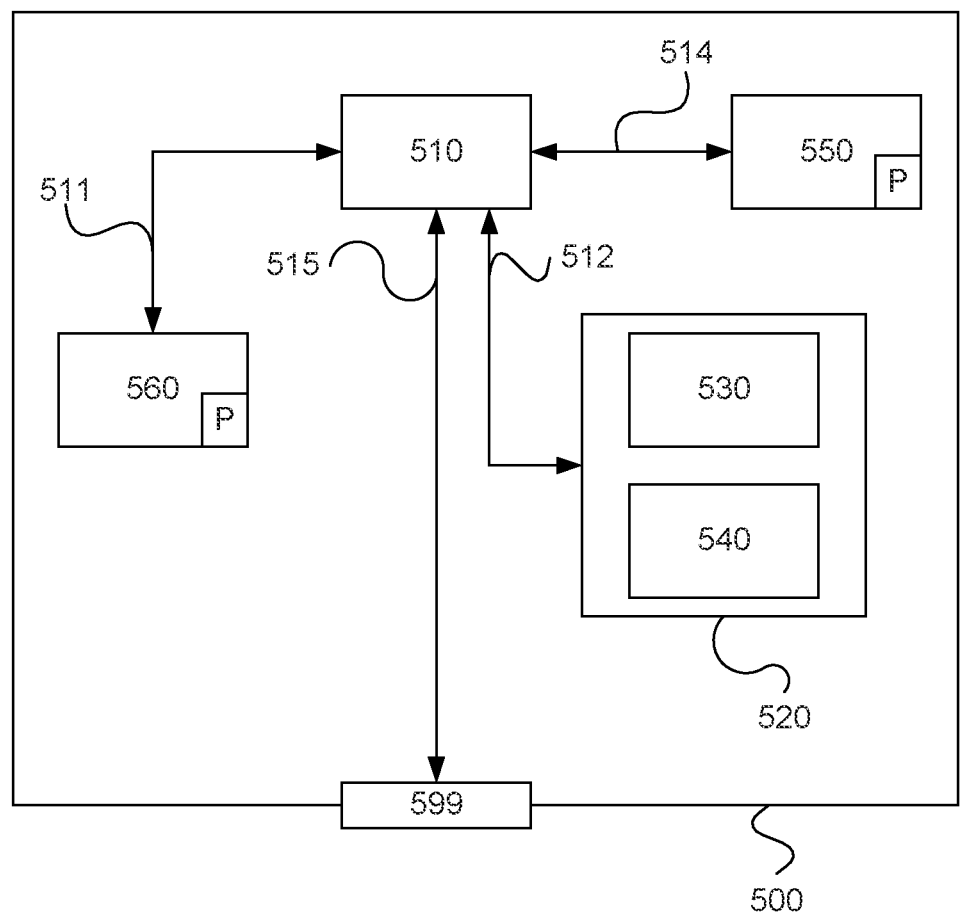
FIG. 5 schematically illustrates a computer according to an embodiment of the invention.

FIG. 5 is a diagram of one version of a device 500. The control units 200 and 210 described with reference to FIG. 2 may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

The computer program P comprises routines for diagnosing functionality of dosing units of a fluid dosing system comprising at least two dosing units, a tank unit for holding a fluid and a pump unit for pressurizing said fluid for said dosing units.

The computer program P may comprise routines for determining first pressure variations downstream of said pump unit during sole operation of a first dosing unit of said dosing system.

The computer program P may comprise routines for determining second pressure variations downstream of said pump unit during sole operation of a second dosing unit of said dosing system.

The computer program P may comprise routines for determining a first hydraulic stiffness value B1 on the basis of said first pressure variations.

The computer program P may comprise routines for determining said first hydraulic stiffness value B1 by using amplitude and periodicity of said first pressure variations.

The computer program P may comprise routines for determining a second hydraulic stiffness value B2 on the basis of said second pressure variations.

The computer program P may comprise routines for determining said second hydraulic stiffness value B2 by using amplitude and periodicity of said second pressure variations.

The computer program P may comprise routines for comparing said first hydraulic stiffness value B1 and said second hydraulic stiffness value B2.

The computer program P may comprise routines for, in case said first hydraulic stiffness value B1 and said second hydraulic stiffness value B2 differs to a certain extent, concluding that malfunction of at least one of said dosing units is at hand, and in case said first hydraulic stiffness value B1 and said hydraulic stiffness value B2 do not differ to said certain extent, concluding that said first dosing unit and said second dosing unit function as intended.

The computer program P may comprise routines for, if it is concluded that malfunction of at least one of said dosing units is at hand, determining which one of said first dosing unit and said second dosing unit is associated with a malfunction.

The computer program P may comprise routines for determining which one of said first dosing unit and said second dosing unit is associated with a malfunction by at least one of the following test procedures, said procedures comprising the step of:
1) using tank fluid volume changes determined during operation of the dosing system;
2) using pump unit operation determined during operation of the dosing system;
3) using fluid flow to and from said first dosing unit and said second dosing unit determined during operation of the dosing system; or
4) performing service workshop tests of said first dosing unit and said second dosing unit.

The computer program P may comprise routines for, in case said dosing system comprises three or more dosing units, determining a respective hydraulic stiffness value B1, B2, Bn for said at least three dosing units based upon pressure variations downstream of said pump unit during sole operation of each dosing unit of said dosing system. The computer program P may comprise routines for determining which one of said at least three dosing units is associated with a malfunction by means of pairwise mutual comparison for all determined hydraulic stiffness values B1, B2, . . . , Bn.

The computer program P may comprise routines for performing any of the process steps detailed with reference to FIG. 4b.

The program P may be stored in an executable form or in compressed form in a memory 560 and/or in a read/write memory 550.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L210, L230, L231, L237a, L237b, L237c and L239, for example, may be connected to the data port 599 (see FIGS. 2a and 2b).

When data are received on the data port 599, they are stored temporarily in the second memory element 540. When input data received have been temporarily stored, the data processing unit 510 will be prepared to conduct code execution as described above.

Parts of the methods herein described may be conducted by the device 500 by means of the data processing unit 510 which runs the program stored in the memory 560 or the read/write memory 550. When the device 500 runs the program, method steps and process steps herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The components and features specified above may within the framework of the invention be combined between different embodiments specified.

The invention claimed is:

1. A method for diagnosing functionality of dosing units of a fluid dosing system comprising at least two dosing units, a tank unit for holding a fluid, and a pump unit for pressurizing said fluid for said dosing units, said method comprising the steps of:
   determining first pressure variations downstream of said pump unit during sole operation of a first dosing unit of said dosing system;
   determining second pressure variations downstream of said pump unit during sole operation of a second dosing unit of said dosing system;
   determining a first hydraulic stiffness value on the basis of said first pressure variations;
   determining a second hydraulic stiffness value on the basis of said second pressure variations;
   comparing said first hydraulic stiffness value and said second hydraulic stiffness value; and
   when said first hydraulic stiffness value and said second hydraulic stiffness value differs to a certain extent, concluding that a malfunction of at least one of said dosing units is occurring, and when said first hydraulic stiffness value and said second hydraulic stiffness value do not differ to said certain extent, concluding that said first dosing unit and said second dosing unit function as intended.

2. The method according to claim 1, further comprising the step of:
   when it is concluded that the malfunction of at least one of said dosing units is occurring, determining which one of said first dosing unit and said second dosing unit is associated with the malfunction.

3. The method according to claim 2, wherein determining which one of said first dosing unit and said second dosing unit is associated with the malfunction is determined using at least one of the following test procedures:
   1) using tank fluid volume changes determined during operation of the dosing system;
   2) using pump unit operation determined during operation of the dosing system;
   3) using fluid flow to and from said first dosing unit and said second dosing unit determined during operation of the dosing system; or 4) performing service workshop tests of said first dosing unit and said second dosing unit.

4. The method according to claim 1, further comprising the steps of:
determining said first hydraulic stiffness value by using an amplitude and a periodicity of said first pressure variations; and
determining said second hydraulic stiffness value by using an amplitude and a periodicity of said second pressure variations.

5. The method according to claim 1, further comprising the steps of:
when said dosing system comprises at least three dosing units, determining a respective hydraulic stiffness value for said at least three dosing units based upon pressure variations downstream of said pump unit during sole operation of each of said at least three dosing units of said dosing system; and
determining which one of said at least three dosing units is associated with the malfunction by means of pairwise mutual comparison for all determined hydraulic stiffness values.

6. A system for diagnosing functionality of dosing units of a fluid dosing system comprising at least two dosing units, a tank unit for holding a fluid, and a pump unit for pressurizing said fluid for said dosing units, said system comprising:
means arranged for determining first pressure variations downstream of said pump unit during sole operation of a first dosing unit of said dosing system;
means arranged for determining second pressure variations downstream of said pump unit during sole operation of a second dosing unit of said dosing system; and
an electronic control unit configured to:
determine a first hydraulic stiffness value on the basis of said first pressure variations;
determine a second hydraulic stiffness value on the basis of said second pressure variations;
compare said first hydraulic stiffness value and said second hydraulic stiffness value; and
conclude that a malfunction of at least one of said dosing units is at hand when said first hydraulic stiffness value and said second hydraulic stiffness value differs to a certain extent, and conclude that said first dosing unit and said second dosing unit function as intended when said first hydraulic stiffness value and said second hydraulic stiffness value do not differ to said certain extent.

7. The system according to claim 6, wherein the electronic control unit is further configured to:
determine which one of said first dosing unit and said second dosing unit is associated with the malfunction when it is concluded that the malfunction of at least one of said dosing units is occurring.

8. The system according to claim 7,
wherein said electronic control unit is configured to determine which one of said first dosing unit and said second dosing unit is associated with the malfunction is determined using at least one of the following test procedures:
1) use of tank fluid volume changes determined during operation of the dosing system;
2) use of pump unit operation determined during operation of the dosing system;
3) use of fluid flow to and from said first dosing unit and said second dosing unit determined during operation of the dosing system; or 4) provision of service workshop tests of said first dosing unit and said second dosing unit.

9. The system according to claim 6, wherein said electronic control unit is further configured to:
determine said first hydraulic stiffness value by using an amplitude and a periodicity of said first pressure variations; and
determine said second hydraulic stiffness value by using an amplitude and a periodicity of said second pressure variations.

10. The system according to claim 6, wherein said electronic control unit is further configured to:
when said dosing system comprises at least three dosing units, determine a respective hydraulic stiffness value for said at least three dosing units based upon pressure variations downstream of said pump unit during sole operation of each of said at least three dosing units of said dosing system; and
determine which one of said at least three dosing units is associated with the malfunction by means of pairwise mutual comparison for all determined hydraulic stiffness values.

11. A vehicle comprising a system for diagnosing functionality of dosing units of a fluid dosing system comprising at least two dosing units, a tank unit for holding a fluid, and a pump unit for pressurizing said fluid for said dosing units, said system comprising:
means arranged for determining first pressure variations downstream of said pump unit during sole operation of a first dosing unit of said dosing system;
means arranged for determining second pressure variations downstream of said pump unit during sole operation of a second dosing unit of said dosing system; and
an electronic control unit is configured to:
determine a first hydraulic stiffness value on the basis of said first pressure variations;
determine a second hydraulic stiffness value on the basis of said second pressure variations;
compare said first hydraulic stiffness value and said second hydraulic stiffness value; and
conclude that a malfunction of at least one of said dosing units is at hand when said first hydraulic stiffness value and said second hydraulic stiffness value differs to a certain extent, and conclude that said first dosing unit and said second dosing unit function as intended when said first hydraulic stiffness value and said second hydraulic stiffness value do not differ to said certain extent.

12. The vehicle according to claim 11, wherein said vehicle is one of: a truck, a bus, or a passenger car.

13. A computer program product comprising computer program code stored on a non-transitory computer-readable medium, said computer program product used for diagnosing functionality of dosing units of a fluid dosing system comprising at least two dosing units, a tank unit for holding a fluid, and a pump unit for pressurizing said fluid for said dosing units, said computer program code comprising computer instructions to cause one or more electronic control units to perform the following operations:
determining first pressure variations downstream of said pump unit during sole operation of a first dosing unit of said dosing system;
determining second pressure variations downstream of said pump unit during sole operation of a second dosing unit of said dosing system;
determining a first hydraulic stiffness value on the basis of said first pressure variations;

determining a second hydraulic stiffness value on the basis of said second pressure variations;

comparing said first hydraulic stiffness value and said second hydraulic stiffness value; and when said first hydraulic stiffness value and said second hydraulic stiffness value differs to a certain extent, concluding that a malfunction of at least one of said dosing units is occurring, and when said first hydraulic stiffness value and said second hydraulic stiffness value do not differ to said certain extent, concluding that said first dosing unit and said second dosing unit function as intended.

* * * * *